(12) United States Patent
Onoyama et al.

(10) Patent No.: US 6,404,072 B2
(45) Date of Patent: Jun. 11, 2002

(54) AUTOMATIC STOP/RESTART DEVICE OF VEHICLE ENGINE

(75) Inventors: Taiichi Onoyama; Toshihiro Hirai, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/783,309

(22) Filed: Feb. 15, 2001

(30) Foreign Application Priority Data

Feb. 15, 2000 (JP) ........................................ 2000-037040

(51) Int. Cl.⁷ ............................. F02N 11/06; H02P 9/04
(52) U.S. Cl. ................. 290/40 C; 290/40 A; 290/40 B; 290/40 D; 290/40 R
(58) Field of Search ........................... 290/40 A, 40 B, 290/40 C, 40 D, 40 R

(56) References Cited

U.S. PATENT DOCUMENTS

| | | | | |
|---|---|---|---|---|
| 4,286,683 A | * | 9/1981 | Zeigner et al. | 180/54 R |
| 4,362,133 A | * | 12/1982 | Malik | 123/179 K |
| 4,414,937 A | * | 11/1983 | Ueda et al. | 123/198 D |
| 4,475,493 A | * | 10/1984 | Masteller et al. | 123/179 B |
| 4,482,812 A | * | 11/1984 | Hori et al. | 290/38 R |
| 4,485,772 A | * | 12/1984 | Uchida et al. | 123/179 B |
| 4,766,544 A | * | 8/1988 | Kurihara et al. | 364/424.1 |
| 4,873,637 A | * | 10/1989 | Braun | 364/424.1 |
| 5,205,255 A | * | 4/1993 | Yamagata et al. | 123/331 |
| 6,093,974 A | * | 7/2000 | Tabata et al. | 290/40 R |
| 6,097,314 A | * | 8/2000 | Desens et al. | 340/932.2 |
| 6,131,062 A | * | 10/2000 | Nielsen | 701/50 |
| 6,177,734 B1 | * | 1/2001 | Masberg et al. | 290/31 |
| 6,324,465 B1 | * | 11/2001 | Teramura et al. | 701/96 |
| 6,335,573 B1 | * | 1/2002 | Eguchi et al. | 290/40 C |
| 6,339,740 B1 | * | 1/2002 | Seto et al. | 701/96 |

FOREIGN PATENT DOCUMENTS

| | | | |
|---|---|---|---|
| JP | 52-008241 | * | 1/1977 |
| JP | 2000-274273 | | 10/2000 |

* cited by examiner

Primary Examiner—Nicholas Ponomarenko
Assistant Examiner—Pedro J Cuevas
(74) Attorney, Agent, or Firm—Foley & Lardner

(57) ABSTRACT

In the vehicle provided with a device to automatically stop/start an engine, when a brake pedal depression amount decreases in a state where the engine has temporarily stopped, the engine is restarted to alert the driver. The brake pedal depression amount in this case is set to a level such that a braking force exceeds a creep force. This restarting of the engine encourages the driver to step on the brake pedal, and reinforces braking force. As a result, when the engine is restarted after temporarily stopping due to a command from a control unit regardless of the driver's intention, such as when the battery is being charged, there is less release of the brake pedal. In this way, moving-off of the vehicle regardless of the driver's intention can be prevented.

When automatic stop conditions are satisfied, the engine 1 stops, and when start conditions are satisfied, an induction motor 2 for starting the vehicle is started to restart the engine 1. If the brake pedal depression amount decreases even slightly during temporary stop of the engine, when the brake is released, the engine is restarted. Due to the generation of a creep force, the driver is requested to step on the brake pedal again. As a result, when the engine restarts, for example in order to charge the battery, after temporarily stopping due to a command from the controller unrelated to the driver's intention, the vehicle can be prevented from moving off.

12 Claims, 5 Drawing Sheets

AUTOMATIC STOP/RESTART DEVICE OF VEHICLE ENGINE

FIELD OF THE INVENTION

This invention relates to a device for automatically stopping and restarting an engine.

BACKGROUND OF THE INVENTION

Tokkai 2000-274273 published by the Japanese Patent Office in 2000 discloses a device for automatically stopping an engine to conserve fuel when a vehicle has temporarily stopped, and automatically restarting when the driver steps on the accelerator pedal, while traveling and in the state where a transmission remains in a drive range.

SUMMARY OF THE INVENTION

In a vehicle equipped with an automatic stop/restart device of this type, the engine is restarted based on the command of a control unit, and it is possible that the engine will be restarted unintentionally by the driver, for example, when the battery voltage drops. If the brake pedal is not depressed when this automatic restart is performed, the vehicle moves although unintended by the driver.

It is therefore an object of this invention to prevent a vehicle moving when the engine is restarted based on the command of the control unit which is not based on the driver's intention, in a vehicle provided with the automatic stop/restart device which is capable of performing automatic stop/restart in a drive range.

In order to achieve above object, this invention provides an automatic stop/restart device for an engine of a vehicle, the vehicle comprising a drive wheel, an accelerator pedal, a brake pedal, a battery, and a motive force transmission mechanism which transmits a creep force to the drive wheel according to the rotation of an engine.

The automatic stop/restart device comprises a motor which starts the engine, a sensor which detects if the transmission mechanism is in a drive range wherein the creep force is transmitted to the drive wheel, a sensor which detects that the brake pedal is depressed, a sensor which detects that the accelerator pedal is depressed, a sensor which detects a state of charge (SOC) of the battery, a sensor which detects a depression amount of the brake pedal, and a microprocessor.

The microprocessor is programmed to stop the rotation of the engine when the brake pedal is depressed and the vehicle is stationary, determine if the vehicle is in an idling stop state wherein the brake pedal is depressed, the vehicle is stationary with the engine stopped and the transmission mechanism is in the drive range, restart the engine by the motor when the accelerator pedal is depressed or the battery SOC has fallen below a predetermined SOC in the idling stop state, and restart the engine by the motor when the brake pedal depression amount has decreased by a predetermined amount in the idling stop state.

The details as well as other features and advantages of this invention are set forth in the remainder of the specification and are shown in the accompanying drawings.

DESCRIPTION OF THE PREFERRED EMBODIMENTS

Figure 1:
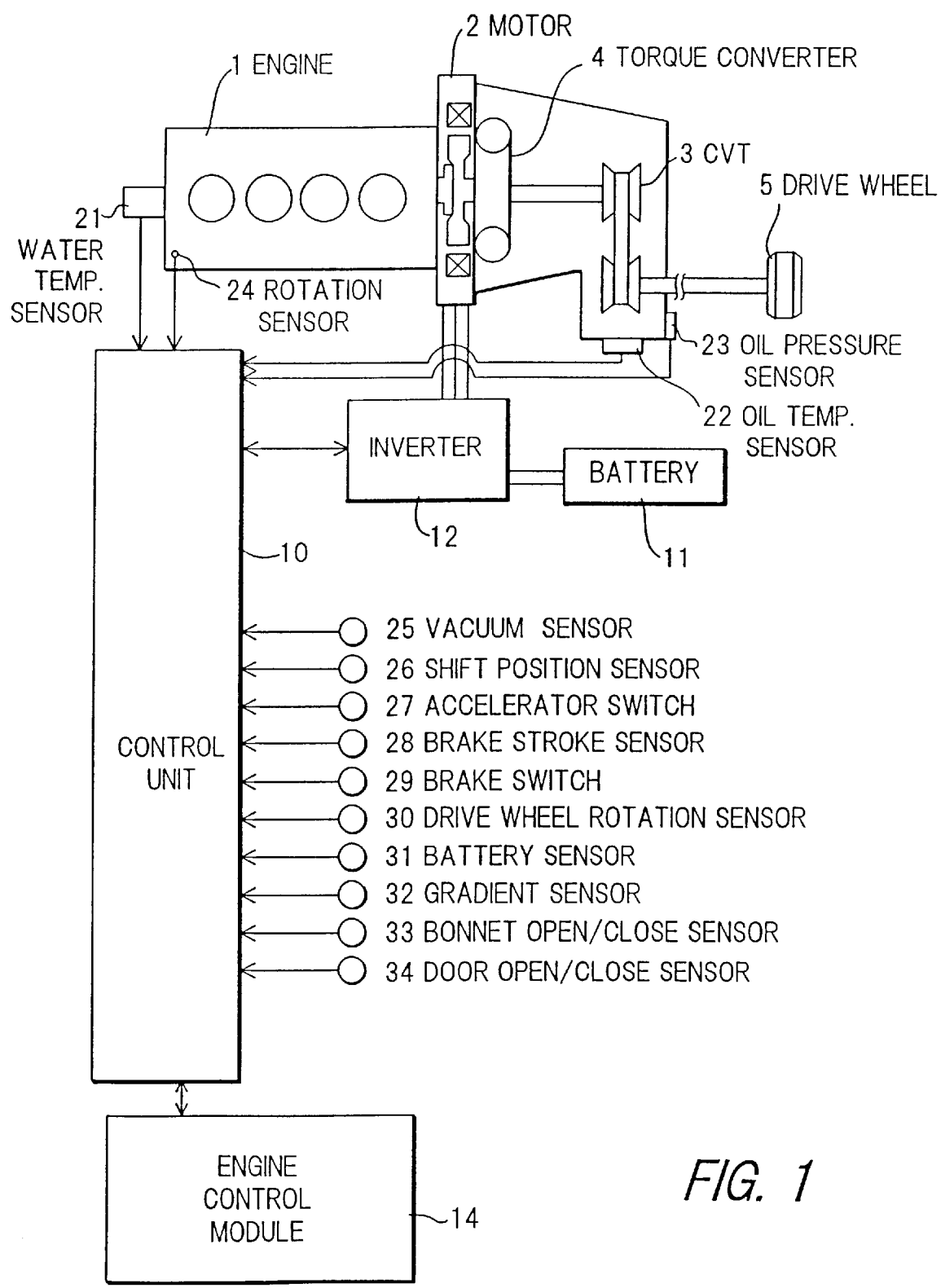
FIG. 1 is a schematic diagram of a vehicle drive system to which this invention is applied.

Referring to FIG. 1 of the drawings, a vehicle drive system to which this invention is applied comprises an engine 1, an induction motor 2 which is connected with the engine 1, a continuously variable transmission (CVT) 3 and a torque converter 4. The engine 1 may be a gasoline engine or a diesel engine. The continuously variable transmission 3 is connected to the induction motor 2 via the torque converter 4. The rotation of an output shaft of the continuously variable transmission 3 is transmitted to drive wheels 5 of the vehicle. Instead of the continuously variable transmission 3, a stepwise automatic transmission may be used. Forward motion and reverse motion of the vehicle is changed over by a forward/reverse change-over mechanism, not shown, interposed between the engine 1 and continuously variable transmission 3.

The induction motor 2 functions as a motor/generator. The induction motor 2 is connected to an output shaft of the engine either directly, or via a gear and a chain. The induction motor 2 functions as a motor, starting the rotation of the engine 1, and also supplements the output of the engine 1 if necessary. Further, the induction motor 2 functions as a generator driven by the engine 1 and charges a battery 11 when a state of charge (SOC) of the battery 11 decreases. It also generates power by recovering energy when the vehicle is coasting and charges the battery 11.

The continuously variable transmission 3 comprises a pair of variable pulleys and a belt looped over these pulleys. By varying the diameters of these variable pulleys, the speed ratio of the rotation pulleys changes. The speed ratio is set to vary according to running conditions. The speed ratio is controlled by adjusting the pulley width, i.e., the groove width of the variable pulleys by oil pressure.

A control unit 10 comprises a microprocessor provided with a central processing unit (CPU), a read-only memory (ROM), a random access memory (RAM), and an input/output interface (I/O interface) (not shown).

The control unit 10 controls the induction motor 2 via an inverter 12. When the induction motor 2 functions as a motor, the control unit 10 commands the inverter 12 to convert the direct current from the battery 11 into alternating current, and supply alternating current to the induction motor 2. When the induction motor 2 functions as a generator, the control unit 10 commands the inverter 12 to supply an exciting current to the induction motor 2, and convert alternating current generated by the induction motor 2 into direct current to charge the battery 11.

The control unit 10 automatically stops the engine 1 by commanding an engine control module 14, when, for example, the vehicle temporarily stops at a crossing. The automatic stopping of the engine on such an occasion is referred to as an idling stop. The control unit 10 drives the induction motor 2 to automatically restart the engine 1 when, for example, the accelerator pedal is depressed or the battery SOC drops.

To perform this control, various signals are input from sensors to the control unit 10. They are a water temperature sensor 21 which detects an engine cooling water temperature, an oil temperature sensor 22 which detects an oil temperature of the continuously variable transmission 3, an oil pressure sensor 23 which detects an oil pressure of the continuously variable transmission 3, a rotation sensor 24 which detects a rotation speed of the engine 1, a vacuum sensor 25 which detects a negative pressure of a brake booster, a shift position sensor 26 which detects a position of a shift lever, an accelerator switch 27 which detects that an accelerator pedal is depressed, a brake stroke sensor 28 which detects a brake pedal depression amount, a brake switch 29 which detects that a brake pedal is depressed, a drive wheel rotation sensor 30 which detects a rotation speed of the drive wheels 5, a battery sensor 31 which detects the SOC of the battery 11, a gradient sensor 32 which detects whether or not the vehicle is traveling on a downhill slope, a bonnet open/close sensor 33 which detects whether a bonnet of the vehicle is open or closed, and a door open/close sensor 34 which detects whether or not doors of the vehicle are all closed.

Figure 2:
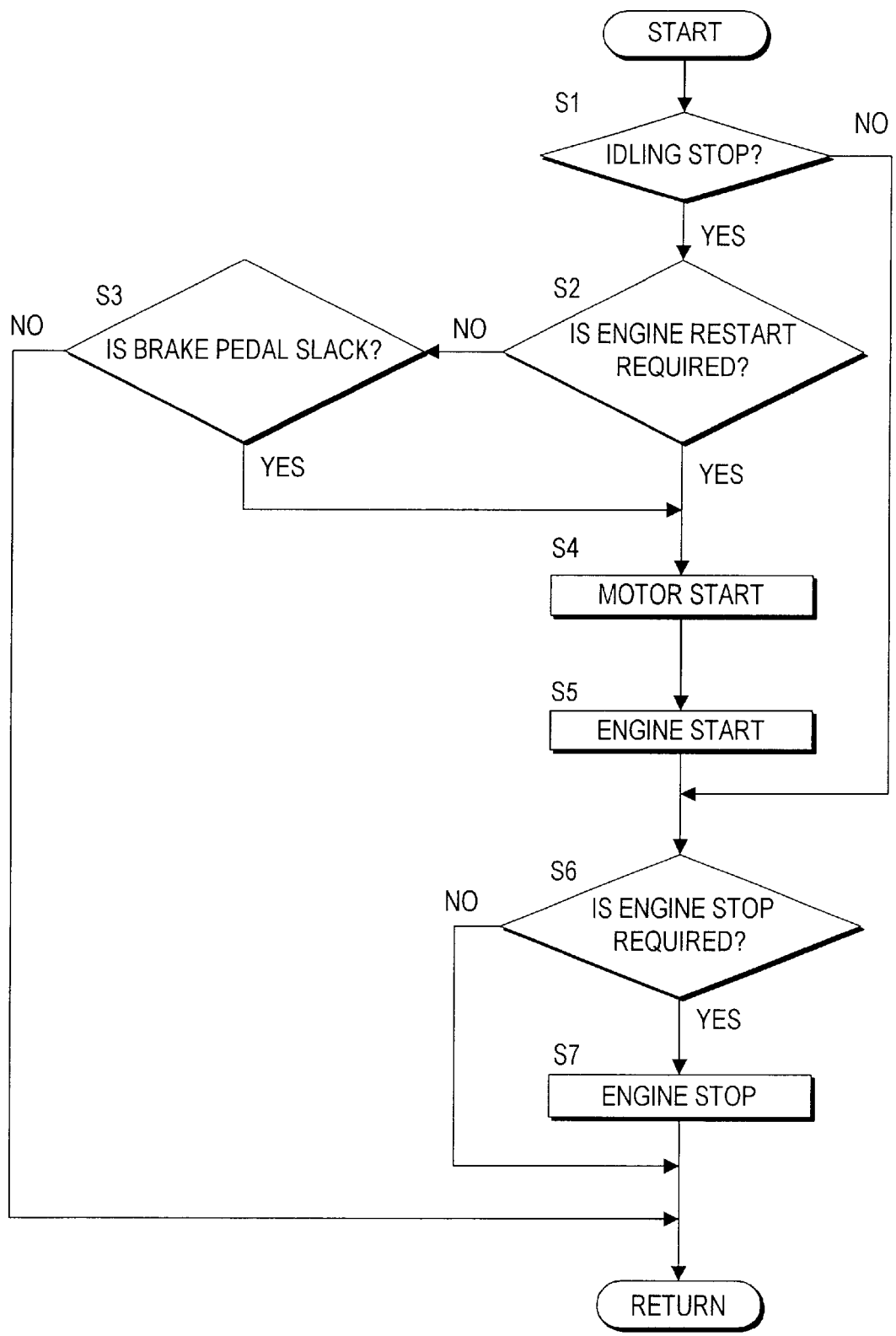
FIG. 2 is a flowchart describing an engine stop/restart control routine performed by a control unit according to this invention.

Referring to the flowchart of FIG. 2, the engine automatic stop and restart control performed by the control unit 10 will now be described.

In a step S1, it is determined whether or not the engine 1 has temporarily stopped with the transmission in a drive range, i.e., whether the vehicle is in an idling stop state. The shift position sensor 26 determines whether or not the transmission is in a drive range wherein a creep force is transmitted to the drive wheels 5. Based on signals from the engine rotation sensor 24, shift position sensor 26, drive wheel rotation sensor 30, bonnet open/close sensor 33 and door open/close sensor 34, it is determined whether or not the engine 1 has stopped while traveling. If the following conditions are all satisfied, it is determined that the engine 1 has temporarily stopped with the transmission in the drive range, and the routine then proceeds to a step S2.

(1) The engine rotation speed is 0.

(2) The transmission is in the drive range.

(3) The vehicle speed, i.e., the rotation speed of the drive wheels, is 0.

(4) The vehicle doors are all closed.

(5) The vehicle bonnet is closed.

In the step S2, it is determined whether or not the restart condition holds, i.e., whether or not an engine restart is required. The restart condition holds when at least one of the following conditions is satisfied.

(1) The accelerator pedal is depressed. In other words, the accelerator switch is ON.

(2) The brake is completely released. In other words, brake switch is OFF.

(3) The battery SOC is less than a predetermined SOC.

(4) The brake booster negative pressure is less than a predetermined negative pressure.

(5) The engine cooling water temperature is less than a predetermined water temperature.

(6) The transmission oil temperature is less than a predetermined oil temperature.

(7) The transmission oil pressure is less than a predetermined oil pressure.

For example, the predetermined SOC is set in the range of 30% to 40% of the full charge state, the predetermined negative pressure is set to about 180 mmHg, the predetermined water temperature is set to about 25° C., the predetermined oil temperature is set to about 25° C., and the predetermined oil pressure is set to about 0.7 MPa. In the present specification, a "negative pressure" means a pressure difference relative to the atmospheric pressure. If a negative pressure is small, an absolute pressure is large.

In the step S2, when the restart is not required, the routine proceeds to a step S3.

In the step S3, it is determined whether or not the brake pedal is slack. In the case where the brake pedal depression amount has decreased by at least a predetermined amount after the engine has automatically stopped, it is determined that the braking has become slack, and startup of the engine 1 is commanded.

In the step S3, when the brake pedal is slack, the routine proceeds to a step S4. Also, when there is a request for startup of the engine in the step S2, the routine proceeds to the step S4. When there is no slackness in braking in the step S3, the control operation is terminated.

In the step S4, the control unit 10 starts the induction motor 2. Due to the rotation of the induction motor 2, a creep force is transmitted from the torque converter 4 to the drive wheels 5 via the continuously variable transmission 3. Also, the engine 1 rotates together with induction motor 2.

The creep force of the torque converter 4 is effectively proportional to the square of the increase of rotation speed.

Next, startup of the engine 1 is performed in a step S5. In the case of a gasoline engine, startup of the engine 1 is performed by fuel injection to the engine, and ignition by a spark plug. Injection may start before ignition so that the ignition proceeds smoothly.

After the startup of the engine 1 is performed, it is determined whether or not engine stop is required in a step S6. When the engine 1 has not automatically stopped with the transmission in the drive range in the step S1, the routine proceeds directly to the step S6.

When the following conditions are all satisfied, it is determined that the automatic engine stop is required.

(1) The vehicle speed is 0.

(2) The brake pedal is depressed. In other words, the brake switch is ON.

(3) The vehicle doors are all closed.

(4) The vehicle bonnet is closed.

(5) The battery SOC is equal to or greater than the predetermined SOC.

(6) The brake booster negative pressure is equal to or greater than the predetermined negative pressure.

(7) The engine cooling water temperature is equal to or greater than the predetermined water temperature.

(8) The transmission oil temperature is equal to or greater than the predetermined oil temperature.

(9) The transmission oil pressure is equal to or greater than the predetermined oil pressure.

If the automatic engine stop is required, the routine proceeds to a step S7.

In the step S7, the control unit 10 stops the engine 1 via the engine control module 14, i.e., the idling stop is performed, and the routine is terminated.

If the automatic engine stop has not been required in the step S6, the routine terminates without performing the process of the step S7.

Subsequently, the flowchart described above is repeated at a predetermined interval, e.g., 10 msec, as an interrupt processing.

Next, the results of the control shown in the flowchart of FIG. 2 will be described.

When the conditions are satisfied for restarting the engine 1 in a state where the engine has stopped, the restart of the engine 1 is performed, and a creep force is generated correspondingly. The engine restarts in the following two cases. Firstly, the driver intentionally restarts the engine. This is the case where the driver releases the brake pedal, and depresses the accelerator pedal.

The other case is where the engine restarts due to a command from the control unit 10 despite the fact that the driver has not intended to start the vehicle. This occurs when, for example, the induction motor 2 generates power due to the fact that the battery SOC has fallen below the predetermined SOC.

According to experimental results, the braking force due to the driver during the vehicle stop is much larger than the creep force when the engine restarts. Therefore, even if the engine restarts due to a command from the control unit 10 when unintended by the driver, the drive wheels usually do not rotate and the vehicle does not move off.

It may occur, however, that the driver releases the depressing force of the brake pedal unconsciously when the engine has temporarily stopped. If the brake pedal is released to the extent that the braking force becomes less than the creep force and the engine 1 is also restarted by a command from the control unit 10, the vehicle will gradually move off.

However, according to this invention, when the brake pedal has been slack in the state where the engine has stopped, the engine 1 restarts. As a result, when the braking force becomes even slightly weaker, the engine 1 restarts immediately as a warning to the driver before the braking force becomes less than the creep force. In this case, the drive wheels 5 do not rotate due to restart of the engine 1. The slackness of the braking is detected as a variation in the brake pedal depression amount. As described above, in the state where the engine has automatically stopped, the brake pedal depression amount is detected by the brake stroke sensor 28. If the brake pedal depression amount has decreased by at least a predetermined amount from the brake pedal depression amount when the operation of the engine 1 has stopped, it is determined that the brake pedal is slack even if the brake switch 29 is ON. The predetermined amount is, for example, set to be 5 mm.

The driver becomes aware of the restarting of the engine, and depresses the brake pedal if he does not intend to start the vehicle. When the brake pedal is again depressed, the conditions for the automatic engine stop are satisfied, so the engine stops. Thus, if the driver's brake depression becomes weaker in the state where the engine has automatically stopped, the driver is alerted by the restart of the engine. Therefore, even when an engine restart unintended by the driver is performed due to a drop in the battery SOC, there is little risk that the vehicle will start to move, because the driver has been frequently alerted to insufficient braking in the state where the engine has automatically stopped. As a result, the vehicle can be prevented from moving unintentionally under a creep force.

Next, a second embodiment of this invention will be described referring to FIG. 3 and FIG. 4.

Figure 3:
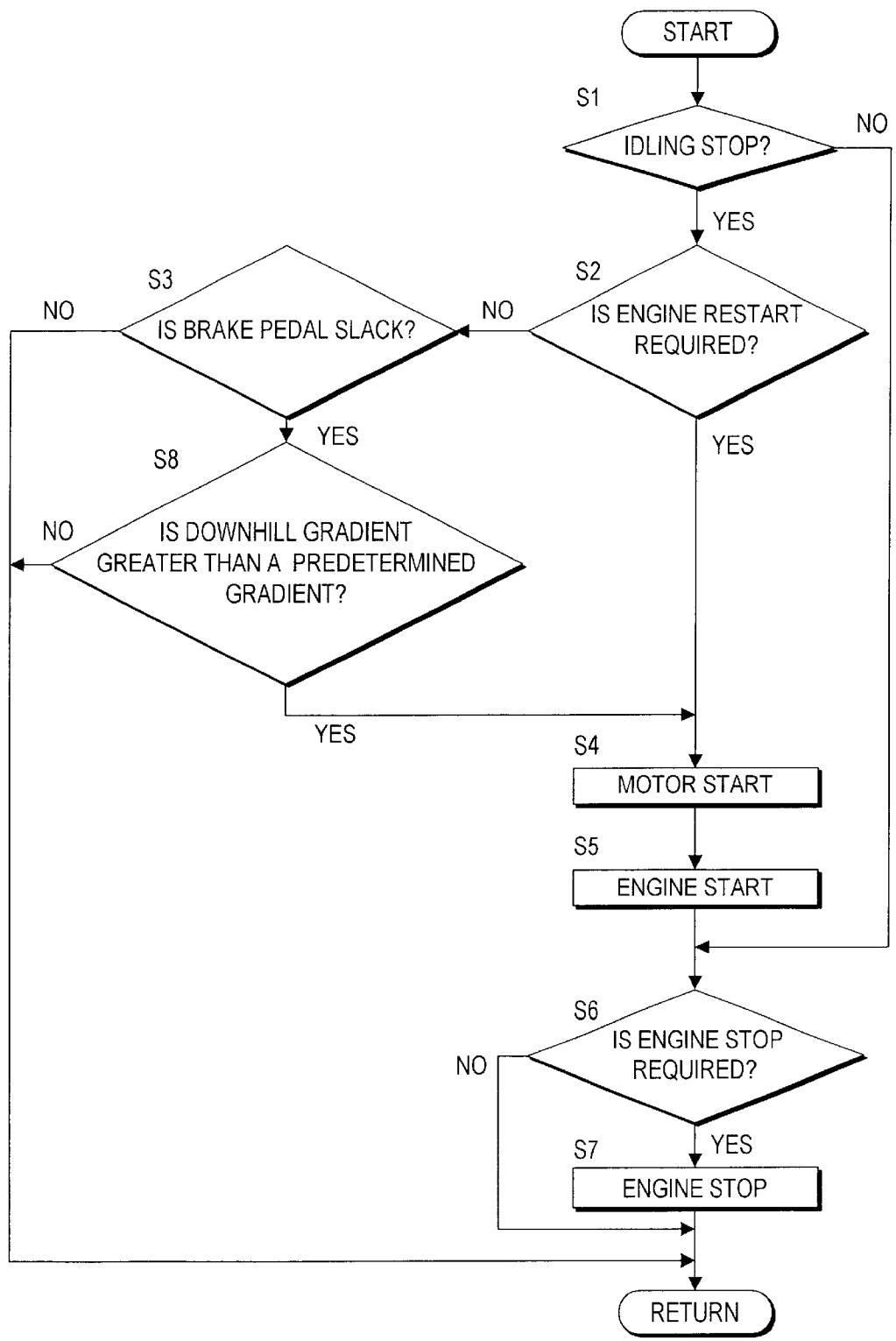
FIG. 3 is a flowchart describing an engine stop/restart control routine according to a second embodiment of this invention.

The flowchart of FIG. 3 shows the control routine performed by the control unit 10 according to the second embodiment.

In this embodiment, the engine is restarted due to a weakening of brake force only when the vehicle is on a downward slope. According to this embodiment, the driver can slightly release the brake when the vehicle is on a flat road.

To realize the above concept, when the brake pedal is slack in the step S3, it is determined in a step S8 whether or not the downhill gradient of a road surface detected by the gradient sensor 32 is greater than a predetermined gradient. When the downhill gradient of the road surface is less than the predetermined gradient, engine restart is not performed and the control operation is terminated. The control operation is terminated also when there is no slackness of the brake pedal in the step S3. The predetermined gradient of the downhill is, for example, set to be in the range of 5% to 10%.

In this way, while the vehicle has stopped on a flat road or a gentle downhill slope, engine restart is not performed even if it is determined that the brake pedal is slack in the step S3.

Hence, the driver can cause the brake pedal to be slack and rest his foot when the vehicle is at rest on a flat road. In this case, the driver may have a feeling that is close to the case where idling stop is not performed.

On the other hand, on a slope which has a downhill gradient larger than the predetermined gradient, the routine shifts to the step S4 and the induction motor 2 starts. Next, the engine 1 restarts in the step S5.

Figure 4:
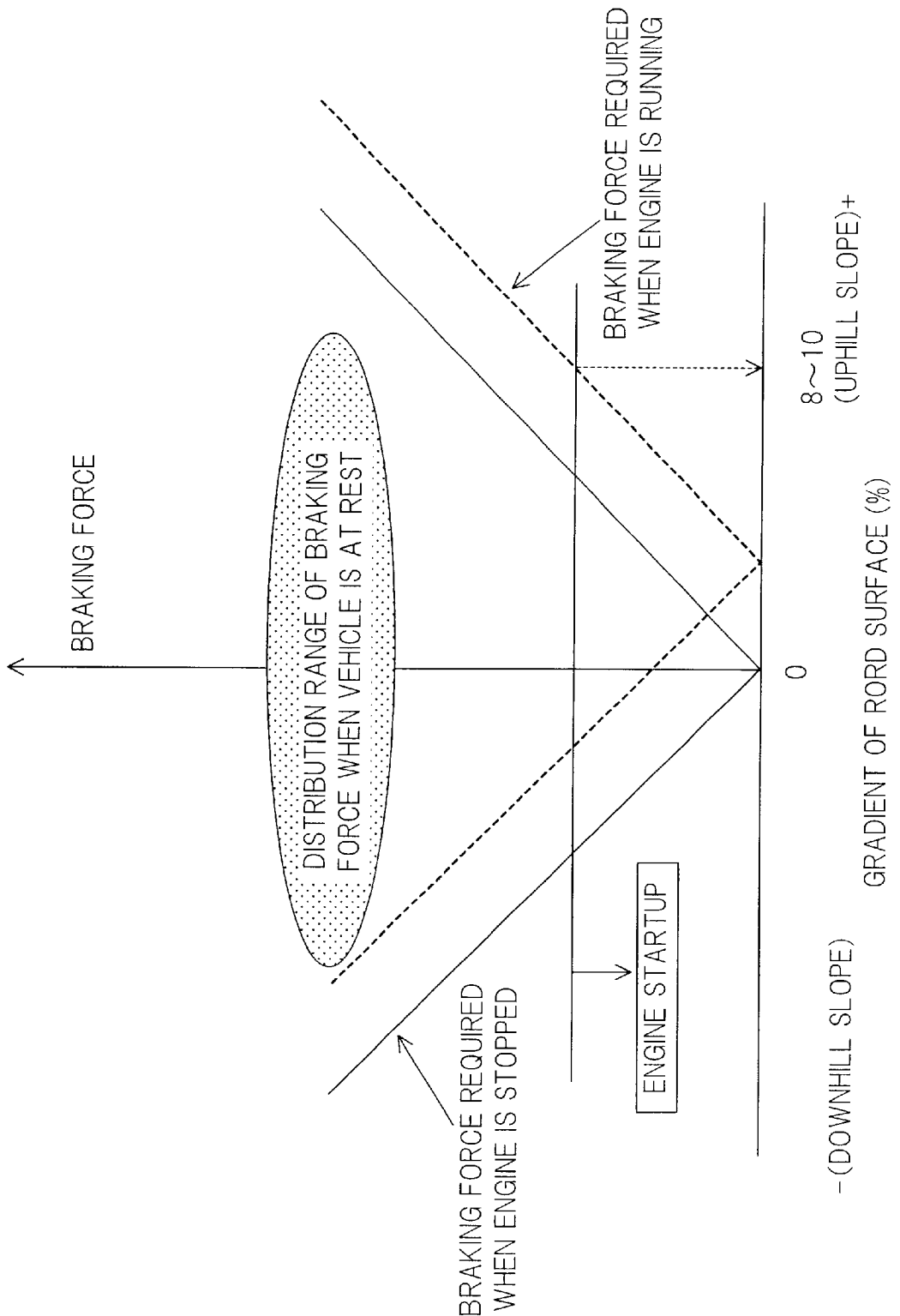
FIG. 4 is a diagram describing a relation between a road surface slope and a braking force required for stopping the vehicle.

FIG. 4 shows the relation between the gradient of the road surface and the braking force required to stop the vehicle. The solid line shows the braking force required to stop the vehicle when the engine has stopped relative to the gradient of the road surface. The dotted line shows the braking force required when a creep force is produced with the engine running relative to the gradient of the road surface. When a creep force is produced due to engine restart on a downhill slope, a large braking force is required compared to a flat road or uphill slope to prevent the vehicle from moving. According to experiment, the braking force due to brake pedal depression is effectively distributed in the dotted region of FIG. 4. Normally, the braking force when the vehicle is at rest is larger than the creep force. If the actual slope is greater than the slope recognized by the driver, the braking force may approach the minimum braking force required to keep the vehicle stationary. If the braking becomes slack in this case, the vehicle may move off due to the creep force.

However, when the downhill gradient is greater than the predetermined gradient and the braking becomes slack, the driver is alerted by immediate restart of the engine. As a result, the brake pedal is again firmly depressed, so the moving-off of the vehicle is definitively prevented.

Figure 5:
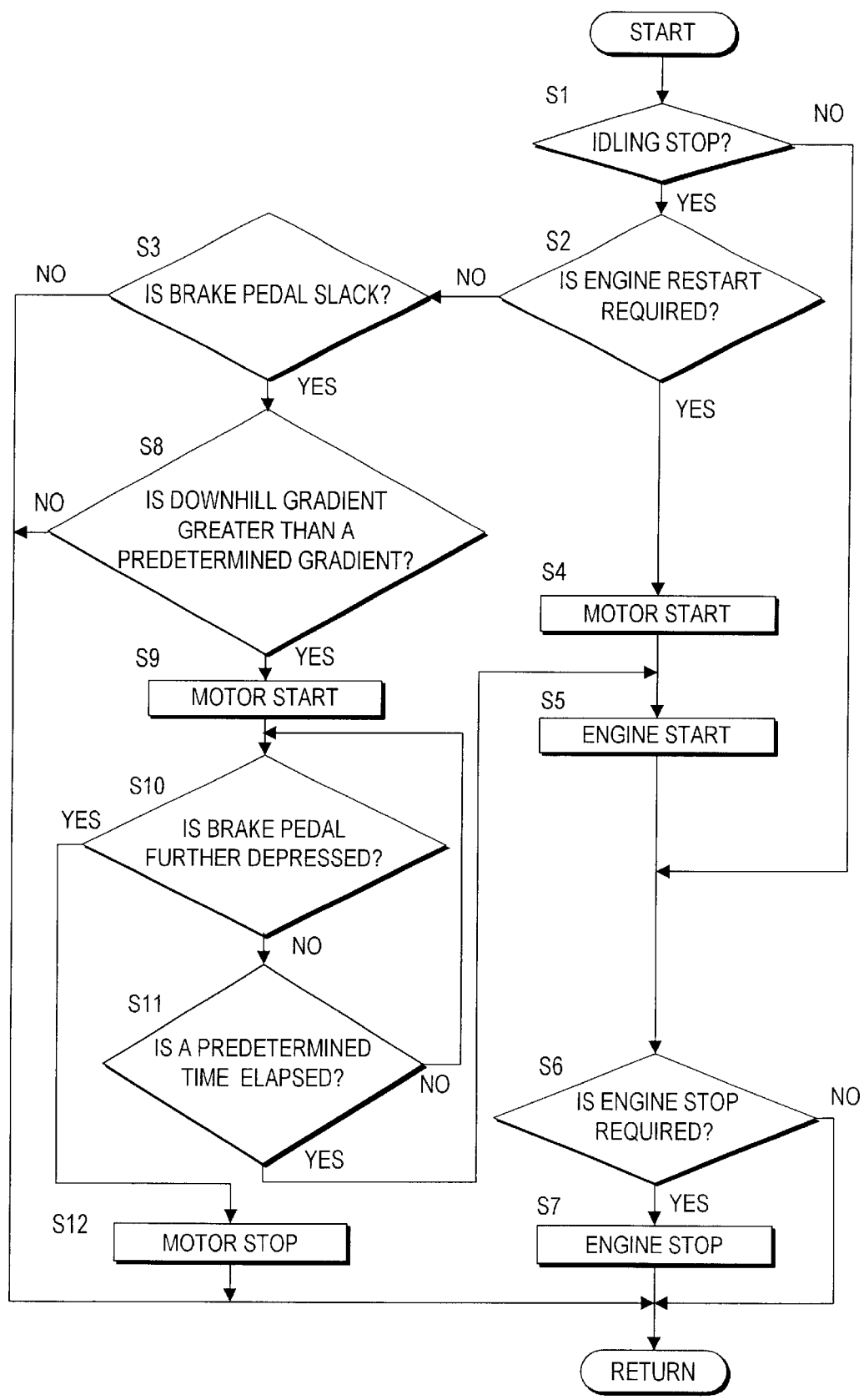
FIG. 5 is a flowchart describing an engine stop/restart control routine according to a third embodiment of this invention.

A third embodiment of this invention will now be described referring to the flowchart of FIG. 5.

According to this embodiment, in the case where the slackness in the braking has been detected, the engine 1 starts after the induction motor 2 has rotated within a predetermined time. When the induction motor 2 rotates, the engine 1 also rotates together, however, until the predetermined time has elapsed, fuel is not supplied to the engine 1. The driver is alerted at a creep force of the induction motor 2 which is less than the creep force due to the engine rotation, so the driver is encouraged to further depress the brake pedal before a large creep force is exerted on the vehicle.

Therefore, when it is determined in the step S3 that braking has become slack, and when it is determined in a step S8 that the downhill gradient is greater than the predetermined gradient, the induction motor 2 is started in a step S9. Subsequently, in the step S10, it is determined whether or not the brake pedal has been further depressed, i.e. whether or not the brake pedal is slack, based on a signal from the brake stroke sensor 28. When the brake pedal is not further depressed, it is determined in a step S11 whether or not the predetermined time, e.g., 1.5 seconds, has elapsed after the induction motor 2 has started. When the predetermined time has not elapsed, the routine returns to the step S10.

If the driver becomes aware of a weak creep force due to starting of the induction motor 2 during this predetermined time of, e.g., 1.5 seconds, and depresses the brake pedal further, the routine proceeds from the step S10 to the step S12. In the step S12, the induction motor 2 stops, and the startup of the engine will not be performed.

The creep force due to the operation of the induction motor 2 is less than the creep force due to the operation of the engine, so even when the braking has become slack, there is very little possibility that the vehicle will move off due to the starting of the induction motor 2. Therefore, it is possible to alert the driver without actually starting the vehicle. If the driver depresses the brake pedal during this alert and eliminate the slackness of the brake pedal, the induction motor 2 stops. Therefore, an appropriate warning is given to the driver, and the idling stop state of the engine 1 can be maintained.

If the brake pedal is not further depressed within the predetermined time, the routine proceeds to the step S5 from the step S11 and the startup of the engine 1 is performed. Due to the startup of the engine 1, a more powerful creep force is generated, and the driver is strongly motivated to depress the brake pedal more firmly.

If the creep force due to the induction motor 2 is set to be as small as the extra drive force usually added by the extra engine rotation when the air-conditioner is operated, the vehicle will definitely not move off. Therefore, the driver can effectively be alerted to a drop in the brake force without risking the vehicle to move.

In this embodiment, when the brake is slack, the induction motor 2 starts during the predetermined time only when the vehicle is stationary on a downhill slope having a gradient greater than the predetermined gradient. However, this control of the induction motor 2 may of course also be performed when the vehicle stops on a flat road. Also, in this embodiment, the engine 1 is started after the induction motor 2 is driven for the predetermined time after the braking was found to be slack. However, control may be performed to stop the engine when it is detected that the brake pedal is depressed firmly within the predetermined time after the engine 1 starts immediately due to rotation of the induction motor 2.

The entire contents of Japanese Patent Applications P2000-37040 (filed Feb. 15, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An automatic stop/restart device for an engine of a vehicle, the vehicle having a drive wheel, an accelerator pedal, a brake pedal, a battery, and a motive force transmission mechanism which transmits a creep force to the drive wheel according to a rotation of the engine, comprising, a motor which starts the engine, a sensor which detects if the transmission mechanism is in a drive range wherein the creep force is transmitted to the drive wheel, a sensor which detects that the brake pedal is depressed, a sensor which detects that the accelerator pedal is depressed, a sensor which detects a state of charge (SOC) of the battery, a sensor which detects a depression amount of the brake pedal, and a microprocessor programmed to:

stop the rotation of the engine when the brake pedal is depressed and the vehicle is stationary, determine if the vehicle is in an idling stop state wherein the brake pedal is depressed, the vehicle is stationary with the engine stopped, and the transmission mechanism is in the drive range, restart the engine by the motor when the accelerator pedal is depressed or the battery SOC has fallen below a predetermined SOC in the idling stop state, and restart the engine by the motor when the brake pedal depression amount has decreased by a predetermined amount in the idling stop state.

2. The automatic stop/restart device as defined in claim 1, wherein the predetermined amount is set to an amount where the vehicle can be maintained in a stationary state against the creep force.

3. The automatic stop/restart device as defined in claim 1, wherein the restart device further comprises a sensor which detects a negative pressure of a brake booster with which the brake is provided, and the microprocessor is further programmed to restart the engine by the motor regardless of the operation of the brake pedal when the brake booster negative pressure has fallen below a predetermined negative pressure in the idling stop state.

4. The automatic stop/restart device as defined in claim 1, wherein the restart device further comprises a sensor which detects an engine cooling water temperature, and the microprocessor is further programmed to restart the engine by the motor regardless of the operation of the brake pedal when the engine cooling water temperature has fallen below a predetermined water temperature in the idling stop state.

5. The automatic stop/restart device as defined in claim 1, wherein the restart device further comprises a sensor which detects an oil temperature of a transmission with which the motive force transmission mechanism is provided, and the microprocessor is further programmed to restart the engine by the motor regardless of the operation of the brake pedal when the oil temperature of the transmission has fallen below a predetermined oil temperature in the idling stop state.

6. The automatic stop/restart device as defined in claim 1, wherein the restart device further comprises a sensor which detects an oil pressure of a transmission with which the motive force transmission mechanism is provided, and the microprocessor is further programmed to restart the engine by the motor regardless of the operation of the brake pedal when the oil pressure of the transmission has fallen below a predetermined oil pressure in the idling stop state.

7. The automatic stop/restart device as defined in claim 1, wherein the restart device further comprises a sensor which detects a gradient of the vehicle, and the microprocessor is further programmed to prevent the motor from starting when the vehicle is not on a downward gradient greater than a predetermined gradient even if the brake pedal depression amount has decreased by more than the predetermined amount in the idling stop state.

8. The automatic stop/restart device as defined in claim 1, wherein the microprocessor is further programmed to prevent the engine from starting for a predetermined time while operating the motor when the brake pedal depression amount has decreased by the predetermined amount.

9. The automatic stop/restart device as defined in claim 1, wherein the microprocessor is further programmed to stop the running of the engine again after restart of the engine, when the brake pedal has been depressed within a predetermined time from restart of the engine via the motor.

10. The automatic stop/restart device as defined in claim 8, wherein the motive force transmission mechanism is further designed to transmit a creep force to the drive wheel according to the rotation of the motor.

11. The automatic stop/restart device as defined in claim 8, wherein the microprocessor is further programmed to stop the operation of the motor when the brake pedal is depressed within the predetermined time.

12. An automatic stop/restart device for an engine of a vehicle, the vehicle comprising a drive wheel, an accelerator pedal, a brake pedal, a battery, and a motive force transmission mechanism which transmits a creep force to the drive wheel according to a rotation of the engine, comprising, means for detecting if the transmission mechanism is in a drive range wherein the creep force is transmitted to the drive wheel, means for detecting that the brake pedal is depressed, means for detecting that the accelerator pedal is depressed, means for detecting a state of charge (SOC) of the battery, means for detecting a depression amount of the brake pedal, means for stopping the rotation of the engine when the brake pedal is depressed and the vehicle is stationary, means for determining if the vehicle is in an idling stop state wherein the brake pedal is depressed, the vehicle is stationary with the engine stopped, and the transmission mechanism is in the drive range, means for restarting the engine when the accelerator pedal is depressed or the battery SOC has fallen below a predetermined SOC in the idling stop state, and means for restarting the engine when the brake pedal depression amount has decreased by a predetermined amount in the idling stop state.

* * * * *